US012638572B2

(12) United States Patent　　　　(10) Patent No.:　　US 12,638,572 B2
Huang et al.　　　　　　　　　　　　(45) Date of Patent:　　　May 26, 2026

(54) AUXILIARY INSTALLATION TOOL FOR VEHICLE RADAR

(71) Applicant: Arcadyan Technology Corporation, Hsinchu City (TW)

(72) Inventors: Kuan-Lin Huang, Changhua County (TW); Shin-Lung Kuo, Kaohsiung City (TW)

(73) Assignee: ARCADYAN TECHNOLOGY CORPORATION, Hsinchu City (TW)

(*) Notice: Subject to any disclaimer, the term of this patent is extended or adjusted under 35 U.S.C. 154(b) by 338 days.

(21) Appl. No.: 18/387,065

(22) Filed: Nov. 6, 2023

(65) Prior Publication Data

US 2024/0183967 A1　　Jun. 6, 2024

(30) Foreign Application Priority Data

Dec. 5, 2022　(TW) ................................. 111213404

(51) Int. Cl.
　　*G01S 13/46*　　　　(2006.01)
(52) U.S. Cl.
　　CPC ......... *G01S 13/46* (2013.01); *G01S 2013/468* (2013.01)
(58) Field of Classification Search
　　None
　　See application file for complete search history.

(56) References Cited

FOREIGN PATENT DOCUMENTS

| CN | 107515385 | * 12/2017 |
|----|-----------|-----------|
| CN | 108422941 A | 8/2018 |
| CN | 113866733 A | 12/2021 |

OTHER PUBLICATIONS

CN108422941 translation (Year: 2018).*
Search report issued by European Patent Office on May 29, 2024.

* cited by examiner

*Primary Examiner* — Whitney Moore
(74) *Attorney, Agent, or Firm* — WPAT, PC

(57) ABSTRACT

An auxiliary installation tool for a vehicle radar includes an angle ruler. The angle ruler includes a first reference section, a second reference section, and a radar installation section. The first reference section and the second reference section are connected and intersect at a right angle, wherein during measurement, the first reference section is configured for aligning with a vehicle body horizontal line, the second reference section is configured for aligning with or parallel to a vehicle rear horizontal line, the vehicle body horizontal line and the vehicle rear horizontal line respectively extend along the body and the rear of a vehicle and intersect at a corner of the vehicle. The radar installation section is correspondingly located at the corner of the vehicle, and the radar installation section and the second reference section are connected and intersect at a radar installation angle.

10 Claims, 6 Drawing Sheets

AUXILIARY INSTALLATION TOOL FOR VEHICLE RADAR

This application claims the benefit of Taiwan application Serial No. 111213404, filed Dec. 5, 2022, the subject matter of which is incorporated herein by reference.

BACKGROUND OF THE INVENTION

Field of the Invention

The disclosure relates in general to an installation tool, and more particularly to an auxiliary installation tool for a vehicle radar.

Description of the Related Art

In recent years, in order to comply with road safety regulations, more and more vehicles are equipped with radars for ranging and warning purposes. Generally speaking, vehicles need to pass radar verification testing before leaving the factory to ensure that the radar device is installed correctly. However, radar installation and alignment are difficult. As long as the installation angle or installation position is biased or exceeds the error range, the radar device will fail to pass the predetermined verification testing. In addition, most radar testing methods collect reflected wave data when the radar wave is reflected by the radar reflector. However, the installation angle and installation position of the radar device are different for each car model. Therefore, how to accurately locate the angular relationship and positional relationship between the vehicle and the radar device to make the collected reflected wave data accurate is actually a problem that the industry needs to overcome.

SUMMARY OF THE INVENTION

The present disclosure relates to an auxiliary installation tool for a vehicle radar to assist the installer in locating the radar installation angle.

According to an embodiment of the present disclosure, an auxiliary installation tool for a vehicle radar includes an angle ruler. The angle ruler includes a first reference section, a second reference section, and a radar installation section. The first reference section and the second reference section are connected and intersect at a right angle, wherein during measurement, the first reference section is configured for aligning with a vehicle body horizontal line, the second reference section is configured for aligning with or parallel to a vehicle rear horizontal line, the vehicle body horizontal line and the vehicle rear horizontal line respectively extend along the body and the rear of a vehicle and intersect at a corner of the vehicle. The radar installation section is correspondingly located at the corner of the vehicle, and the radar installation section and the second reference section are connected and intersect at a radar installation angle.

The above and other aspects of the invention will become better understood with regard to the following detailed description of the preferred but non-limiting embodiment(s). The following description is made with reference to the accompanying drawings.

DETAILED DESCRIPTION OF THE INVENTION

Figure 1A:
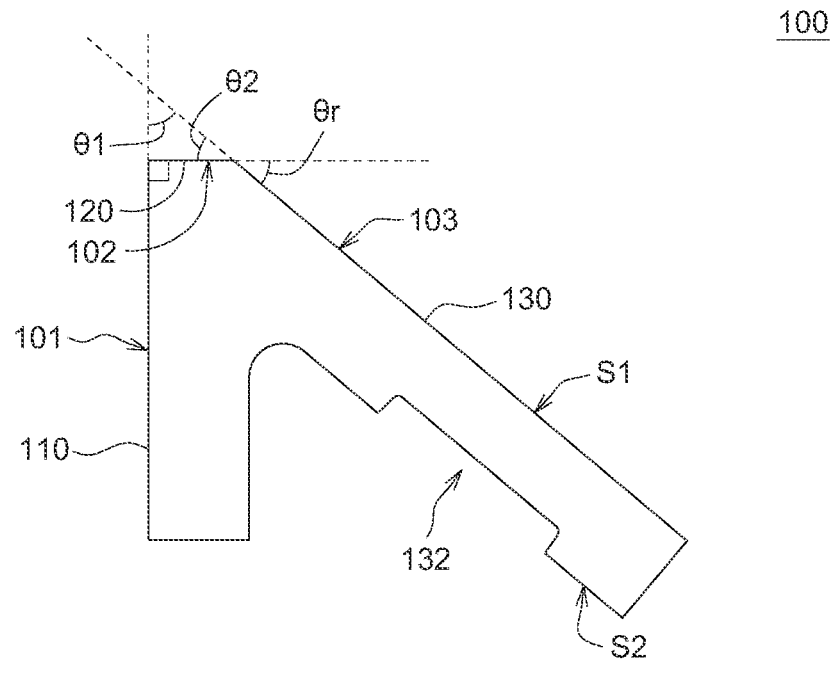
FIGS. 1A and 1B are respectively schematic diagrams of a vehicle radar auxiliary installation tool according to an embodiment of the present disclosure.
Figure 1B:
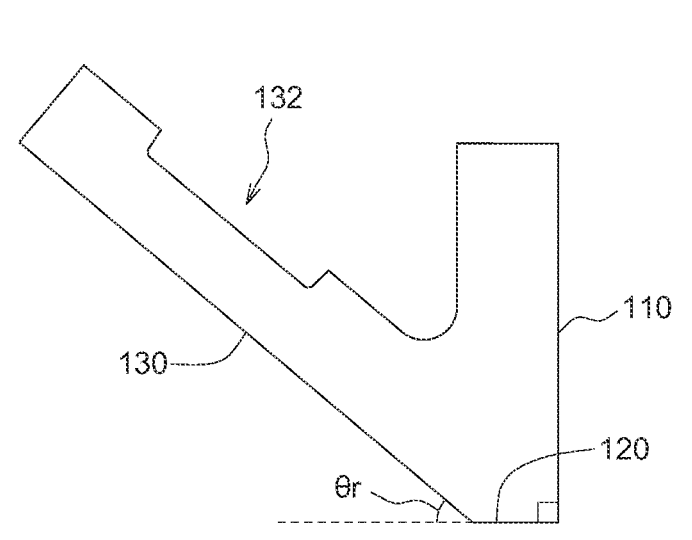

Referring to FIGS. 1A and 1B, schematic diagrams of a vehicle radar auxiliary installation tool according to an embodiment of the present disclosure are respectively illustrated. The vehicle radar auxiliary installation tool includes an angle ruler 100. The angle ruler 100 includes a first reference section 110, a second reference section 120 and a radar installation section 130. The first reference section 110 and the second reference section 120 are connected and intersect at a right angle. In addition, the radar installation section 130 and the second reference section 120 are connected and intersect at a radar installation angle $\theta r$.

As shown in FIG. 1A, the first reference section 110 is located on the first side 101 of the angle ruler 100, the second reference section 120 is located on the second side 102 of the angle ruler 100, and the radar installation section 130 is located on the third side 103 of the angle ruler 100. The first side 101, the second side 102 and the third side 103 are connected and have unequal lengths. In an embodiment, the length of the first side 101 is about 113 mm, the length of the second side 102 is about 25.4 mm, and the length of the third side 103 is about 176.2 mm. The length of the third side 103 is the longest, the length of the first side 101 is second, and the length of the second side 102 is the shortest, but the present disclosure is not limited thereto.

The first reference section 110 and the second reference section 120 intersect perpendicularly to form a right angle. The extension line of the first reference section 110 intersects the extension line of the radar installation section 130 at a first angle $\theta 1$ (for example, $50\pm 2$ degrees). In addition, the extension line of the radar installation section 130 and the second reference section 120 form a second angle $\theta 2$ (for example, $40\pm 2$ degrees), and the extension line of the first reference section 110, the second reference section 120 and the extension line of the radar installation section 130 form a right triangle. According to the internal angle relationship of the right triangle, it can be seen that the first angle $\theta 1$ and the second angle $\theta 2$ are complementary angles. Therefore, the sum of the first angle $\theta 1$ and the second angle $\theta 2$ is 90 degrees, and the second angle $\theta 2$ and the radar installation angle $\theta r$ are opposite angles, so the second angle $\theta 2$ is equal to the radar installation angle $\theta r$. Therefore, when the first angle $\theta 1$ and the second angle $\theta 2$ are known angles, the radar installation angle $\theta r$ can be defined based on the first angle $\theta 1$ and the second angle $\theta 2$.

As the name suggests, the radar installation section 130 is configured to assist the installer in aligning the radar installation angle $\theta r$ and the orientation. The radar installation section 130 has opposite sides (the outer side S1 and the inner side S2), and the inner side S2 of the radar installation section 130 has, for example, a groove 132 with a width of approximately 65.1 mm, which is configured for a radar device 12 (e.g., transmitter/receiver) of the same size to be accommodated in the groove 132 so that the radar device 12 (see FIGS. 2A and 2B) can be aligned with the angle ruler 100 for the installer.

Figure 2A:
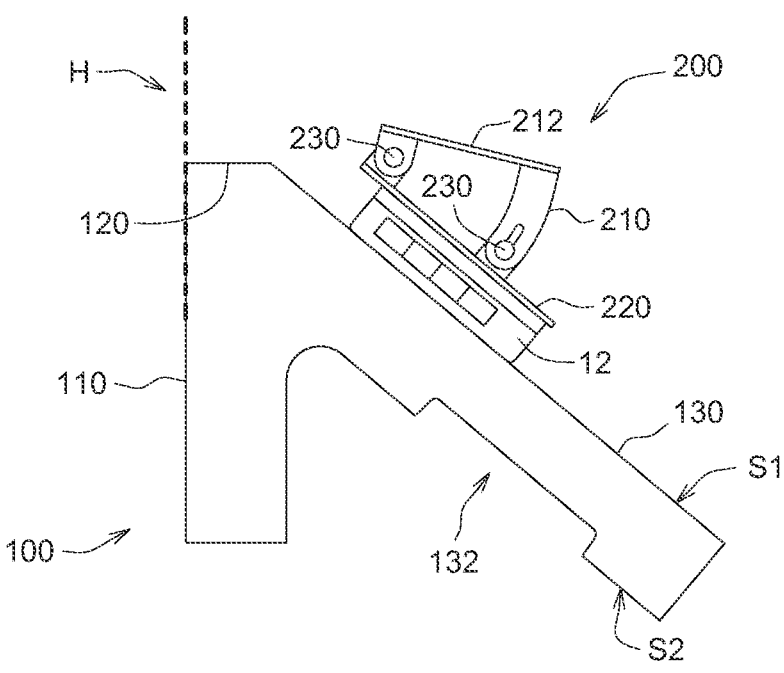
FIGS. 2A and 2B are schematic diagrams of a vehicle radar installation angle according to an embodiment of the present disclosure.
Figure 2B:
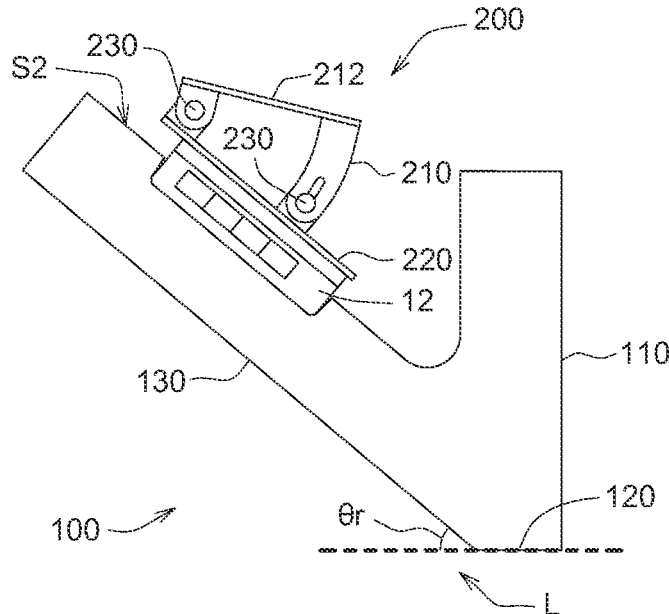

Referring to FIGS. 2A and 2B, schematic diagrams of a vehicle radar installation angle θr according to an embodiment of the present disclosure are respectively illustrated. In one embodiment, in order to facilitate the installation of the radar device 12 on the vehicle 10, the radar mounting bracket 200 has a fixing bracket 210, an adjusting member 220 and a plurality of positioning members 230. The adjusting member 220 is adjustable in angle relative to the fixing bracket 210. The adjusting member 220 is substantially parallel to the radar installation section 130, and the fixing surface 212 of the fixing bracket 210 is substantially parallel to the second reference section 120 and is fixed on the vehicle 10. The radar device 12 is fixed on the adjusting member 220, and the installation angle and installation position of the radar device 12 can be changed by tuning the angle and position of the adjusting member 220 to suit different vehicles 10. The positioning members 230 (such as bolts passing through the screw holes) are configured to fix the angle and orientation between the adjusting member 220 and the fixing bracket 210.

As shown in FIG. 2A, when the installation angle and installation position of the radar device 12 are measured, one side (outer side S1) of the radar installation section 130 of the angle ruler 100 leans against the radar device 12, so that the adjusting member 220 is approximately parallel to the radar installation section 130, and then it is detected whether the first reference section 110 is aligned with the vehicle body horizontal line H. When the first reference section 110 is aligned with the vehicle body horizontal line H, it means that the installation angle and installation position of the radar device 12 meet the regulations; otherwise, when the first reference section 110 is not aligned with the vehicle body horizontal line H, it means that the installation angle and installation position of the radar device 12 do not meet the regulations.

Next, as shown in FIG. 2B, when the installation angle and installation position of the radar device 12 are measured, just rotate the angle ruler 180 degrees in the opposite direction, and the other side (inner side S2) of the radar installation section 130 of the angle ruler 100 leans against the radar device 12, so that the adjusting member 220 is substantially parallel to the radar installation section 130, and then it is detected whether the second reference section 120 is aligned with or parallel to the vehicle rear horizontal line L. When the second reference section 120 is aligned with or parallel to the vehicle rear horizontal line L, it means that the installation angle and installation position of the radar device 12 meet the regulations; otherwise, when the second reference section 120 is not aligned with or parallel to the vehicle rear horizontal line L, it means that the installation angle and installation position of the radar device 12 do not meet the regulations.

Figure 3A:
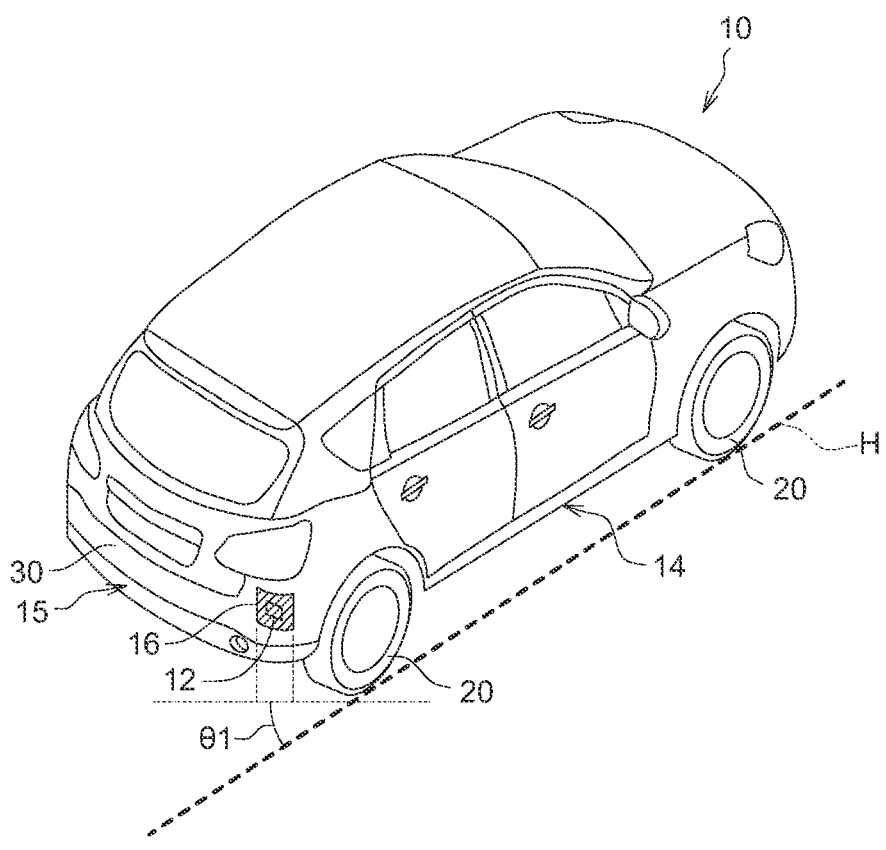
FIGS. 3A to 3C are respectively schematic diagrams of installing a vehicle radar at a corner of a vehicle according to an embodiment of the present disclosure.
Figure 3B:
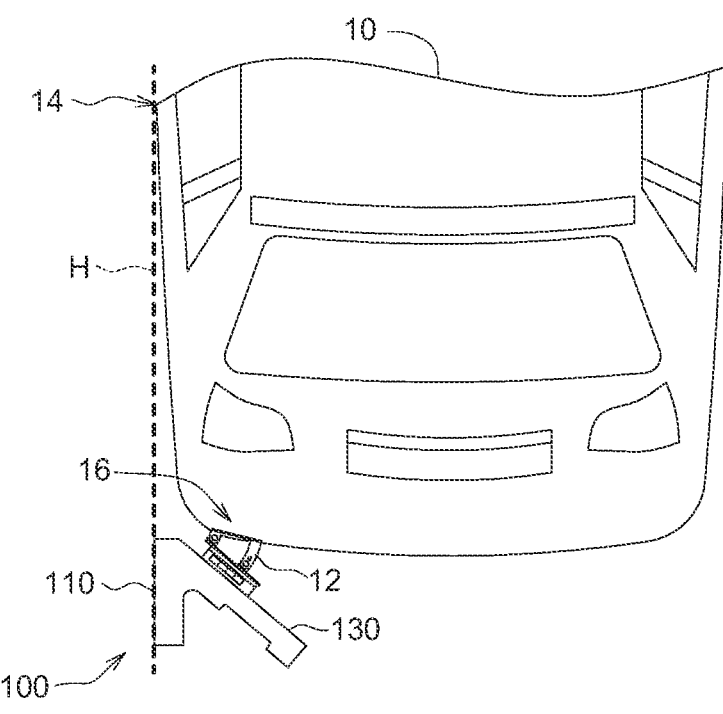
Figure 3C:
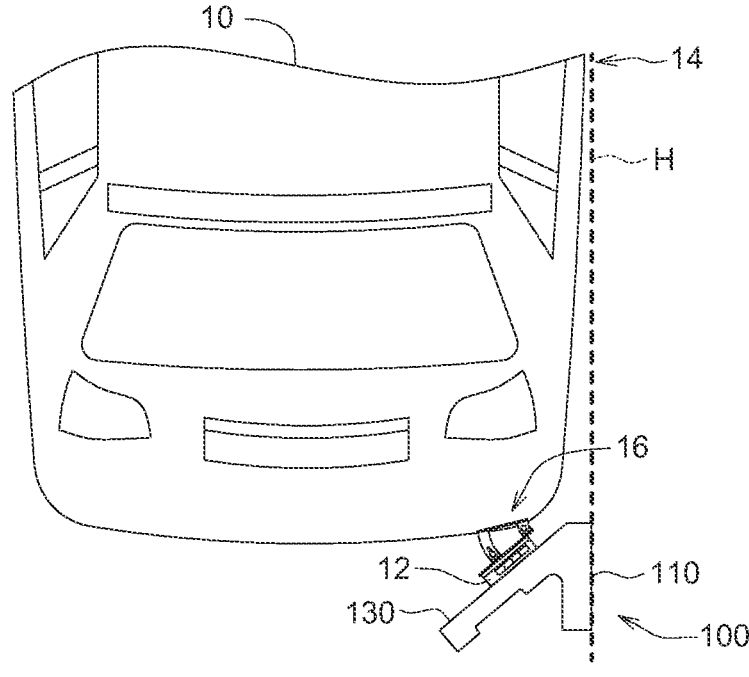

Referring to FIGS. 3A to 3C, schematic diagrams of installing the vehicle radar at the corner 16 of the vehicle 10 according to an embodiment of the present disclosure are respectively illustrated. In FIG. 3A, it is shown that the radar device 12 is installed at the corner 16 of the vehicle and is substantially inclined at a first angle θ1 (for example, 50±2 degrees) with a vehicle body horizontal line H. Through radio wave detection and ranging technology, the radar device 12 can emit electromagnetic energy into space in a direction, and by receiving radio waves reflected by objects in space, the radar device 12 can calculate the direction, height, and speed of objects, and can detect the shape of objects to achieve active detection. In this embodiment, as long as the radar device 12 is fixed at the predetermined installation position of the vehicle 10 through the radar mounting bracket 200, the installation angle of the radar device 12 can be tuned and stably maintained at the predetermined first angle θ1 (for example, 50±2 degrees).

As shown in FIG. 3A, the vehicle body horizontal line H is located on one side of the vehicle 10, and the vehicle body horizontal line H is, for example, the boundary line between the edges of the two tires 20 and the ground, as a basis for observing whether the first reference section 110 is aligned with the vehicle body horizontal line H.

In FIG. 3B, one side of the radar installation section 130 of the angle ruler 100 is placed against the left radar device 12. Then, it is detected whether the first reference section 110 is aligned with the vehicle body horizontal line H. If the first reference section 110 is aligned with the vehicle body horizontal line H, it means that the installation angle and installation position of the left radar device 12 meet the regulations; otherwise, if the first reference section 110 is not aligned with the vehicle body horizontal line H, it means that the installation angle and installation position of the left radar device 12 do not meet the regulations.

In FIG. 3C, one side of the radar installation section 130 of the angle ruler 100 is placed against the right radar device 12, and then it is detected whether the first reference section 110 is aligned with the vehicle body horizontal line H. If the first reference section 110 is aligned with the vehicle body horizontal line H, it means that the installation angle and installation position of the right radar device 12 meet the regulations; otherwise, if the first reference section 110 is not aligned with the vehicle body horizontal line H, it means that the installation angle and installation position of the right radar device 12 do not meet the regulations.

Figure 4A:
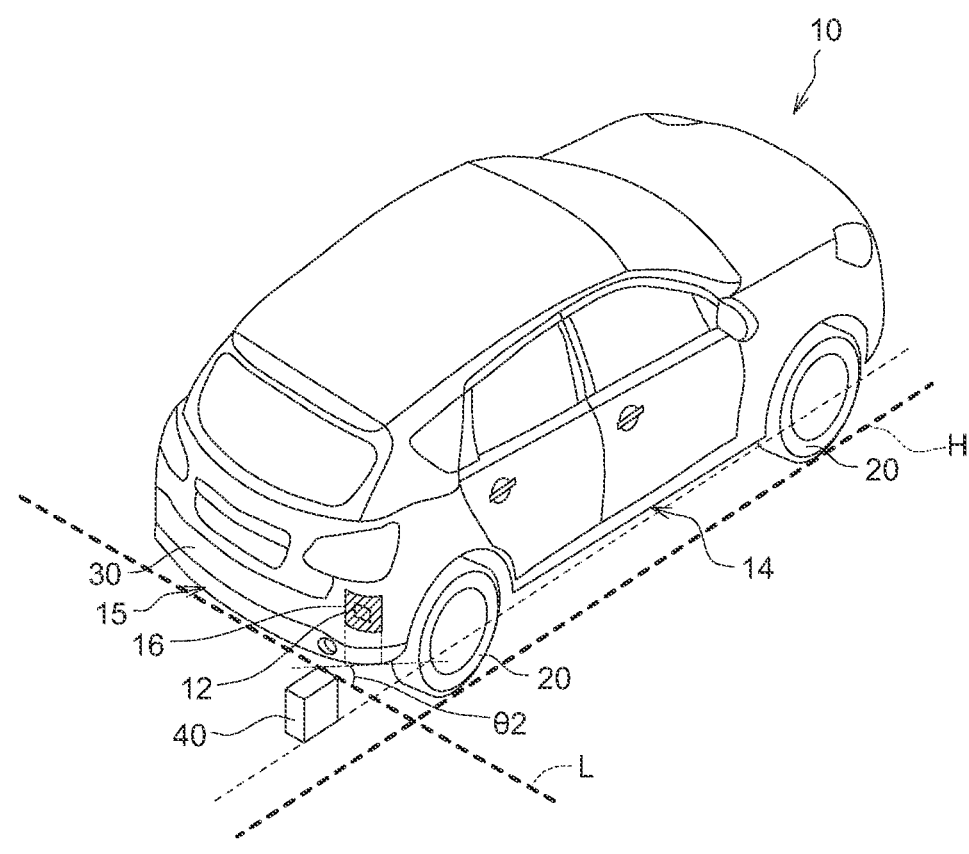
FIGS. 4A to 4C are respectively schematic diagrams of installing a vehicle radar at a corner of a vehicle according to an embodiment of the present disclosure.
Figure 4B:
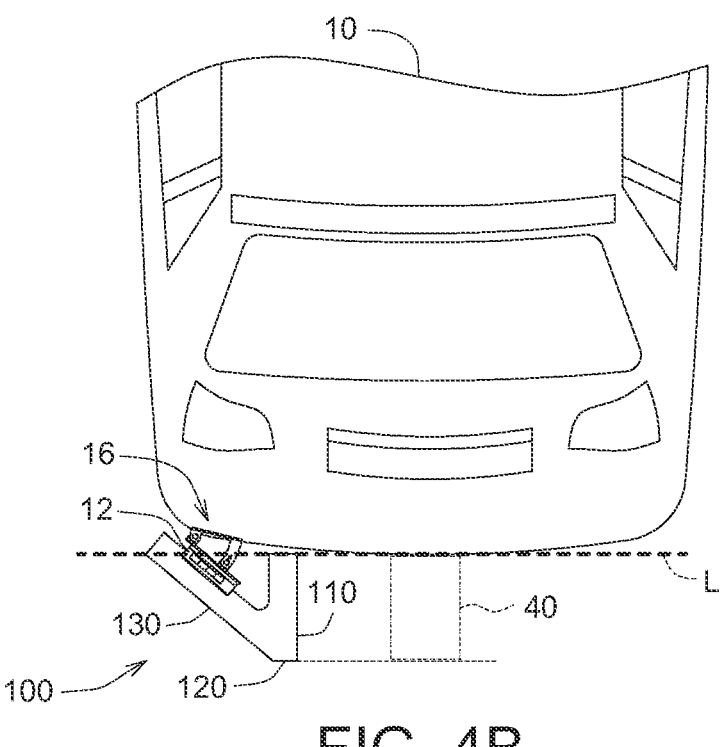
Figure 4C:
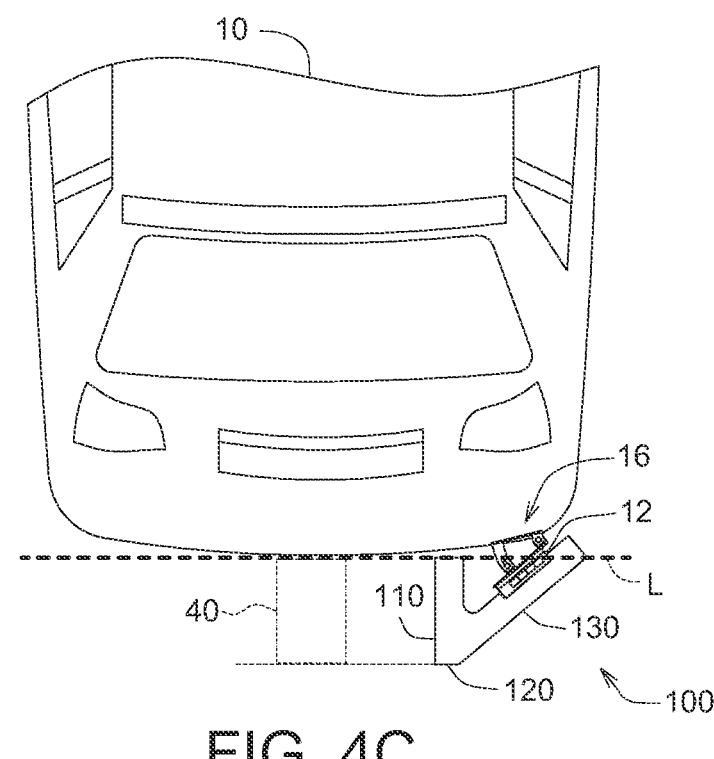

Referring to FIGS. 4A to 4C, schematic diagrams of installing the vehicle radar 12 at the corner 16 of the vehicle 10 according to an embodiment of the present disclosure which respectively illustrate. In FIG. 4A, it is shown that the radar device 12 is installed at the corner 16 of the vehicle 10 and is substantially inclined at a second angle θ2 (see FIG. 2B, θ2=θr, for example, 40±2 degrees) with the vehicle rear horizontal line L. The vehicle rear horizontal line L substantially intersects with the vehicle body horizontal line H perpendicularly, and the vehicle body horizontal line H and the vehicle rear horizontal line L respectively extend along the body 14 and the rear 15 of the vehicle 10 and intersect at a corner 16 (located on the left and right sides of the vehicle 10). Since the design principle of the angle ruler 100 in this embodiment is consistent with the radar installation angle θr (see FIG. 1A, the sum of the first angle θ1 and the second angle θ2 is 90 degrees, and the second angle θ2 is equal to the radar installation angle θr), therefore, as long as the angle ruler 100 is set down, there is no need to use precise instruments to measure the radar installation angle θr, thereby reducing manual inspection time and costs.

As shown in FIG. 4A, the vehicle rear horizontal line L is located on one side of the vehicle 10, and the vehicle rear horizontal line L is, for example, the boundary line between the edge of the rear bumper 30 and the ground, as a basis for observing whether the second reference section 120 is aligned with or parallel to the vehicle rear horizontal line L. In this embodiment, the alignment block 40 is disposed at the rear of the vehicle 10, and its edge position is substantially on the same horizontal line as the second reference section 120 of the angle ruler 100, which can help the installer to evaluate whether the second reference section 120 is parallel to the vehicle rear horizontal line L by observing alignment of the alignment block 40 and the second reference section 120.

In FIG. 4B, the other side of the radar installation section 130 of the angle ruler 100 is placed against the left radar device 12, and then it is detected whether the second reference section 120 is aligned with or parallel to the vehicle rear horizontal line L. If the second reference section 120 is aligned with or parallel to the vehicle rear horizontal line L, it means that the installation angle and installation position of the left radar device 12 meet the regulations; otherwise, if the second reference section 120 is not aligned with or parallel to the vehicle rear horizontal line L, it means that the installation angle and installation position of the left radar device 12 do not meet the regulations.

In FIG. 4C, the other side of the radar installation section 130 of the angle ruler 100 is placed against the right radar device 12, and then it is detected whether the second reference section 120 is aligned with or parallel to the vehicle rear horizontal line L. If the second reference section 120 is aligned with or parallel to the vehicle rear horizontal line L, it means that the installation angle and installation position of the right radar device 12 meet the regulations; otherwise, if the second reference section 120 is not aligned with or parallel to the vehicle rear horizontal line L, it means that the installation angle and installation position of the right radar device 12 do not meet the regulations.

According to the vehicle radar auxiliary installation tool of the above embodiments of the present disclosure, it can be seen that the first reference section of the angle ruler is configured to align a vehicle body horizontal line, and the second reference section is configured to be aligned with or parallel to a vehicle rear horizontal line, and the vehicle body horizontal line and the vehicle rear horizontal line extend along the body and the rear of a vehicle respectively and intersects at a corner of the vehicle body. In addition, the radar installation section is located correspondingly at the corner of the vehicle, and the radar installation section and the second reference section are connected and intersect at a radar installation angle. Therefore, the present disclosure can determine whether the radar installation angle is correct by observing whether the first reference section and the second reference section are aligned with the vehicle body horizontal line and the vehicle rear horizontal line respectively. There is no need to measure the installation angle with precise instruments, thus reducing the manual inspection time and costs.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An auxiliary installation tool for installing a first vehicle radar at a vehicle, wherein the vehicle has a corner and a flat surface near the corner, comprising:

an angle ruler comprising:

a first reference section;

a second reference section; and a radar installation section, wherein the first reference section and the second reference section are connected and intersect at right angles, wherein during measurement, the first reference section is configured to be aligned with a vehicle body horizontal line, the second reference section is configured to be aligned with or be parallel to a vehicle rear horizontal line, and the radar installation section leans against the first vehicle radar for installing the first vehicle radar at the flat surface or the corner of the vehicle, wherein, from top view of the angle ruler, the radar installation section is longer than the first vehicle radar, wherein the vehicle body horizontal line and the vehicle rear horizontal line extend along a body and a rear of the vehicle respectively and intersect at the corner of the vehicle, wherein the radar installation section is correspondingly located at the corner of the vehicle, and the radar installation section and the second reference section are connected and intersect at a radar installation angle, wherein the radar installation section is longer than the first reference section, and the first reference section is longer than the second reference section.

2. The auxiliary installation tool according to claim 1, wherein the first reference section is located on a first side of the angle ruler, the second reference section is located on a second side of the angle ruler, and the radar installation section is located on a third side of the angle ruler, wherein the first side, the second side and the third side are connected and have unequal lengths.

3. The auxiliary installation tool according to claim 2, wherein the length of the third side is greater than the length of the first side, and the length of the first side is greater than the length of the second side.

4. The auxiliary installation tool according to claim 1, wherein an extension line of the first reference section intersects an extension line of the radar installation section at a first angle, and the extension line of the radar installation section and the second reference section form a second angle, and the extension line of the first reference section, the second reference section and the extension line of the radar installation section form a right triangle.

5. The auxiliary installation tool according to claim 4, wherein the first angle and the second angle are complementary angles, and the second angle and the radar installation angle are opposite angles.

6. The auxiliary installation tool according to claim 5, wherein the first angle is in a range of 50±2 degrees and the second angle is in a range of 40±2 degrees.

7. The auxiliary installation tool according to claim 1, wherein the radar installation section has an outer side and an inner side opposite to the outer side, and the inner side of the radar installation section has a groove for aligning the first vehicle radar.

8. The auxiliary installation tool according to claim 7, wherein during measurement, the outer side of the radar installation section leans against the first vehicle radar and it is detected whether the first reference section is aligned with the vehicle body horizontal line, when the first reference section is aligned with the vehicle body horizontal line, it means that an installation angle and an installation position of the first vehicle radar meet regulations; when the first reference section is not aligned with the vehicle body horizontal line, it means that the installation angle and the installation position of the first vehicle radar do not meet the regulations.

9. The auxiliary installation tool according to claim 7, wherein during measurement, the inner side of the radar installation section leans against the first vehicle radar and it is detected whether the second reference section is aligned with or parallel to the vehicle rear horizontal line, when the second reference section is aligned with or parallel to the vehicle rear horizontal line, it means that an installation angle and an installation position of the first vehicle radar meet regulations; when the second reference section is not aligned with or parallel to the vehicle rear horizontal line, it means that the installation angle and installation position of the first vehicle radar do not meet the regulations.

10. The auxiliary installation tool according to claim 1, wherein the auxiliary installation tool is for installing a second vehicle radar at the vehicle, and two opposite sides of the radar installation section lean against the first and second vehicle radars respectively to install the first and the second vehicle radars at at least two corners of the vehicle.

\* \* \* \* \*